United States Patent
Blaine et al.

(10) Patent No.: US 8,412,366 B2
(45) Date of Patent: Apr. 2, 2013

(54) METHOD AND SYSTEM FOR PORTIONING WORKPIECES TO DIRECTLY-CONTROLLED AND INDIRECTLY-CONTROLLED SPECIFICATIONS

(75) Inventors: George Blaine, Lake Stevens, WA (US); David A. Below, Port Clinton, OH (US); Arthur W. Vogeley, Jr., Seattle, WA (US)

(73) Assignee: John Bean Technologies Corporation, Redmond, WA (US)

( * ) Notice: Subject to any disclaimer, the term of this patent is extended or adjusted under 35 U.S.C. 154(b) by 920 days.

(21) Appl. No.: 12/369,687

(22) Filed: Feb. 11, 2009

(65) Prior Publication Data
US 2009/0149980 A1 Jun. 11, 2009

Related U.S. Application Data

(62) Division of application No. 11/030,622, filed on Jan. 5, 2005, now Pat. No. 7,593,785.

(60) Provisional application No. 60/535,354, filed on Jan. 9, 2004.

(51) Int. Cl.
*G06F 19/00* (2011.01)
(52) U.S. Cl. .............. 700/97; 700/103; 700/186; 703/7; 715/771; 83/102; 83/13; 83/789; 382/110
(58) Field of Classification Search .................. 700/103, 700/97, 186; 703/7; 715/771; 83/102, 13, 83/789; 382/110
See application file for complete search history.

(56) References Cited

U.S. PATENT DOCUMENTS

| | | | |
|---|---|---|---|
| 3,800,650 A | 4/1974 | Schroder | |
| 4,962,568 A | 10/1990 | Rudy | |
| 5,076,124 A | 12/1991 | Whitehouse | |
| 5,163,865 A | 11/1992 | Smith | |
| 5,937,080 A * | 8/1999 | Vogeley et al. | 382/110 |
| 6,164,174 A | 12/2000 | Sigurdsson | |
| 6,612,920 B1 | 9/2003 | Young | |
| 6,974,373 B2 | 12/2005 | Kriesel | |
| 6,983,678 B2 | 1/2006 | Wattles | |
| 7,007,595 B2 | 3/2006 | Ozery | |
| 2002/0034571 A1 | 3/2002 | Zimmerman | |

FOREIGN PATENT DOCUMENTS

| | | |
|---|---|---|
| GB | 2 364 894 A | 2/2002 |
| NZ | 228432 A | 5/1991 |
| WO | 02/079347 A1 | 10/2002 |

* cited by examiner

*Primary Examiner* — Tejal Gami
(74) *Attorney, Agent, or Firm* — Christensen O'Connor Johnson Kindness PLLC

(57) ABSTRACT

A method and system are provided for automatically portioning workpieces, such as food products, into both shape and other user-defined specification(s). Workpieces are portioned both to shape and weight, such as to a weight-specific uniform shape, by adjusting (e.g., scaling up and down or slightly modifying) a desired template shape until the desired weight is achieved depending on the varying thickness of each workpiece. For example, from a thicker workpiece, a smaller-sized piece having a predefined shape and weight is portioned, while from a thinner workpiece, a larger-sized piece having the same predefined shape and weight is portioned. The system permits a user to scan in and edit a desired (reference) shape to be used as a template in the portioning process.

27 Claims, 10 Drawing Sheets

METHOD AND SYSTEM FOR PORTIONING WORKPIECES TO DIRECTLY-CONTROLLED AND INDIRECTLY-CONTROLLED SPECIFICATIONS

CROSS-REFERENCE TO RELATED APPLICATION

This application is a divisional of application Ser. No. 11/030,622, filed Jan. 5, 2005, which claims the benefit of Provisional Application No. 60/535,354, filed Jan. 9, 2004, the disclosure of which are hereby incorporated by reference herein.

FIELD OF THE INVENTION

The present invention relates generally to processing workpieces such as food products, and more specifically, to portioning workpieces into pieces having a user-scanned shape, while also considering one or more other specifications such as weight and size.

BACKGROUND OF THE INVENTION

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion the chicken breast to the weights desired by the customer, with no or limited amount of fat, so as to use the chicken breast most effectively.

Portioning and/or trimming of the workpiece can be carried out by various cutting devices, including high-speed liquid jet cutters (liquids may include, for example, water or liquid nitrogen) or rotary or reciprocating blades, after the food product is transferred from the infeed to a cutting conveyor. Once the portioning/trimming has occurred, the resulting portions are off-loaded from the cutting conveyor and placed on a take-away conveyor for further processing or, perhaps, to be placed in a storage bin.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical parameters, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources. Light from the light source is extended across the moving conveyor belt to define a sharp shadow or light stripe line. When no workpiece is being carried by the infeed conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly at an angle on the workpiece and the shadow line/light stripe. The video camera detects the displacement of the shadow line/light stripe from the position it would occupy if no workpiece were present on the conveyor belt. This displacement represents the thickness (or height) of the workpiece. The width of the workpiece is determined by the width of the irregular shadow line/light stripe. The length of the workpiece is determined by the length of belt travel that shadow lines/light stripes are created by the workpiece. In this regard, an encoder is integrated into the infeed conveyor, with the encoder generating pulses at fixed distance intervals corresponding to the forward movement of the conveyor.

The data and information measured/gathered by the scanning devices are transmitted to a computer, typically on board the portioning apparatus, which records the location of the workpiece on the conveyor as well as the shape and other parameters of the workpiece. With this information, the computer determines how to optimally cut or portion the workpiece at the portioning station, and the portioning may be carried out by various types of cutting/portioning devices.

Automatic portioning systems of food products, such as boneless chicken breasts, should be capable of cutting the products into uniform shape, weight, and other specifications as provided by their users. Oftentimes, the users have finished samples that exemplify the users' particular needs, such as a sample having a desired shape.

Some conventional portioning systems use fixed forms to portion products into a specific shape. A form is like a cookie cutter that is used to stamp out a particular shape, and then the cut piece is trimmed to a desired thickness by various types of knives. The use of forms is cumbersome, in that each form is usable to stamp out only one shape, and thus many forms are required for stamping out various shapes. Also, each form stamps out pieces only to a particular shape, without considering, for example, the resulting weight. Hand cutting is also available for portioning food products into particular shapes, but cutting the products into both uniform shape and uniform weight is very difficult.

Accordingly, a need exists for an improved portioning system, which is capable of cutting workpieces to a specific shape, and of growing, shrinking, or otherwise altering the shape in order to achieve one or more additional specifications such as weight. Preferably, such a portioning system permits a user to readily define the particular shape, and any other specification, to which workpieces are to be portioned.

SUMMARY OF THE INVENTION

According to one aspect, the present invention is directed to an automatic portioning system to portion workpieces, which may have various thicknesses, into a weight-specific uniform shape, such as into portions having both a specific weight and a specific shape, and which thus may be of varying two-dimensional areas, or sizes (width×length), depending on the varying thickness of each workpiece. In various exemplary embodiments, this is achieved by scaling up or down a template having a specific shape on the workpiece until the desired weight is achieved. The scaled up/down template then becomes the cutting path for the workpiece. In some applications, the weight and shape requirements may be relaxed and the workpieces may be cut into portions having approximate weight and shape within user-specified ranges.

According to another aspect of the present invention, the automatic portioning system may portion workpieces into approximate weight and shape, and further within a user-specified range of area, or sizes (width×length).

According to yet another aspect of the present invention, the automatic portioning system may portion workpieces into size-specific shape, such as portions having a specific size (or size range) and a specific shape (or shape range), and thus may be of a varying weight depending on the varying thickness of each workpiece.

In any of the various embodiments of the present method summarized above, workpieces are cut into portions, each having a specific or approximate shape as predefined by the user, while also satisfying one or more other specifications. In other words, the present invention achieves completely automatic "shape" cutting. Although the methods are of particular use in the context of cutting or portioning foodstuffs in the food products industries, and are described herein relative to such application, their use is not limited to this particular application.

According to a further aspect of the present invention, a method of portioning products involves not only portioning workpieces according to shape and one or more other specifications, but also ensuring that the resulting product has desirable characteristics that are not directly controlled by the portioning process. For example, the method simulates portioning a workpiece to a specific shape and weight A or to the same specific shape and weight B. The method then calculates the size (width×length) and/or thickness of the piece resulting from cutting to the specific shape and weight A, or to the specific shape and weight B, respectively. If the resulting size and/or thickness of the piece portioned to the specific shape and weight A is acceptable, then the workpiece is cut to weight A. If not, it is determined if the resulting size and/or thickness of the piece portioned to the specific shape and weight B is acceptable, and if so, the workpiece is cut to weight B. If either cutting to weight A or weight B will not produce an acceptable size and/or thickness, then no solution exists and no cutting will be performed.

According to a still further aspect, the present invention permits a user to define the desired (reference) shape into which the workpieces are to be portioned, by simply scanning in the actual desired shape using the portioning system's vision system. Further, the user is allowed to edit the scanned-in shape in digital data form in order to define a refined shape template to be used in all further processing. To this end, the user can interrupt the normal operation of the automatic portioning system at any time to scan in and edit the desired shape. The desired shape is stored in computer memory and subsequently used to control the downstream cutting/portioning equipment of the portioning system to cut the workpieces into the desired shape.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE EXEMPLARY EMBODIMENTS

Figure 1A:
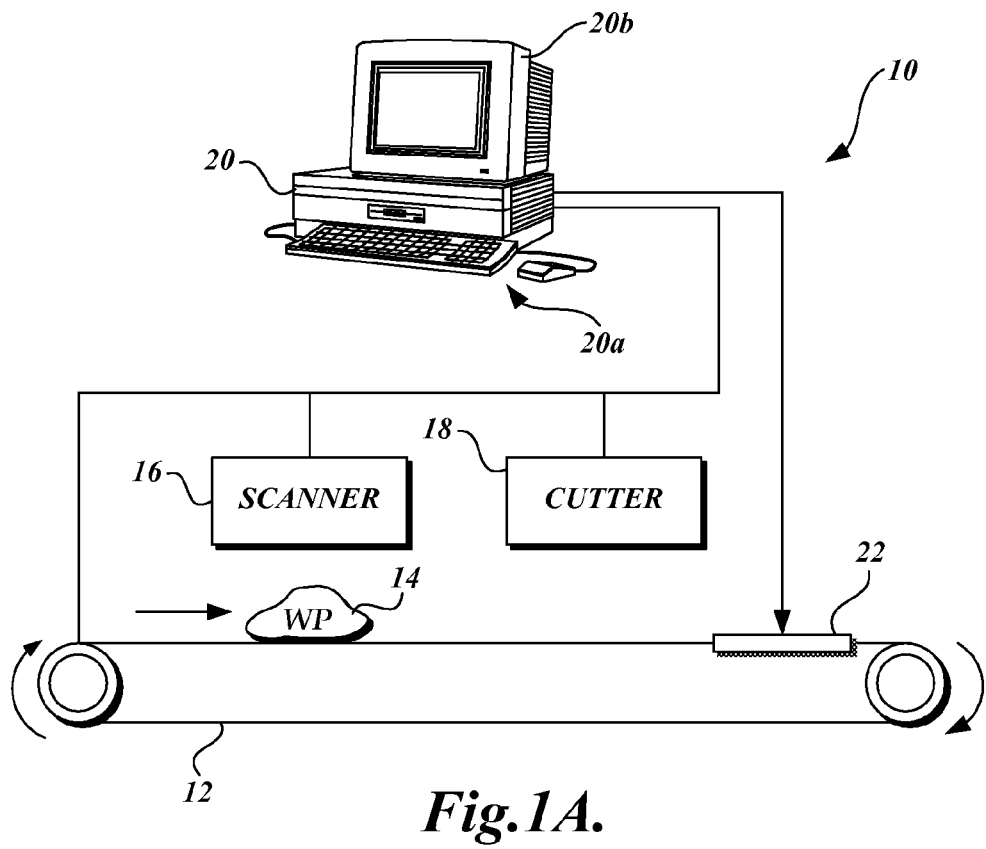
FIG. 1A illustrates a system suitable for use in performing a method of the present invention, wherein the system is operated in Normal Production Mode to process (and portion) workpieces (WP)

FIG. 1A schematically illustrates a system 10 suitable for implementing one embodiment of the present invention. The system 10 includes a conveyor 12 for carrying a workpiece 14 to be portioned thereon, a scanner 16 for scanning the workpiece 14, and a cutter 18 for portioning the workpiece (WP) 14 into one or more pieces. The conveyor 12, scanner 16, and cutter 18 are coupled to, and controlled by, a processor 20. Generally, the scanner 16 scans in the workpiece 14 to produce scanning information representative of the workpiece, and forwards the scanning information to the processor 20. The processor 20 analyzes the scanning information to calculate an optimal cut path to portion the workpiece 14 into one or more desirable pieces. Then, the processor 20 controls the cutter 18 to portion the workpiece 14 according to the calculated cut path. As illustrated, the processor includes an input device 20a (keyboard, mouse, etc.) and an output device 20b (monitor, printer, etc.). The present invention is directed generally to a system and method for cutting workpieces to a particular or approximate shape, while considering one or more other parameters (e.g., weight, length, width, height, etc.).

In various exemplary embodiments, the portioning system 10 is capable of operating in generally two modes: Normal Production Mode and Shape Input Mode. Briefly, during Shape Input Mode, a user is prompted to input and perhaps further edit a reference shape (template) to which workpieces are to be portioned. During Normal Production Mode, the portioning system automatically portions workpieces carried on a conveyor into pieces corresponding to the reference shape.

Figure 2:
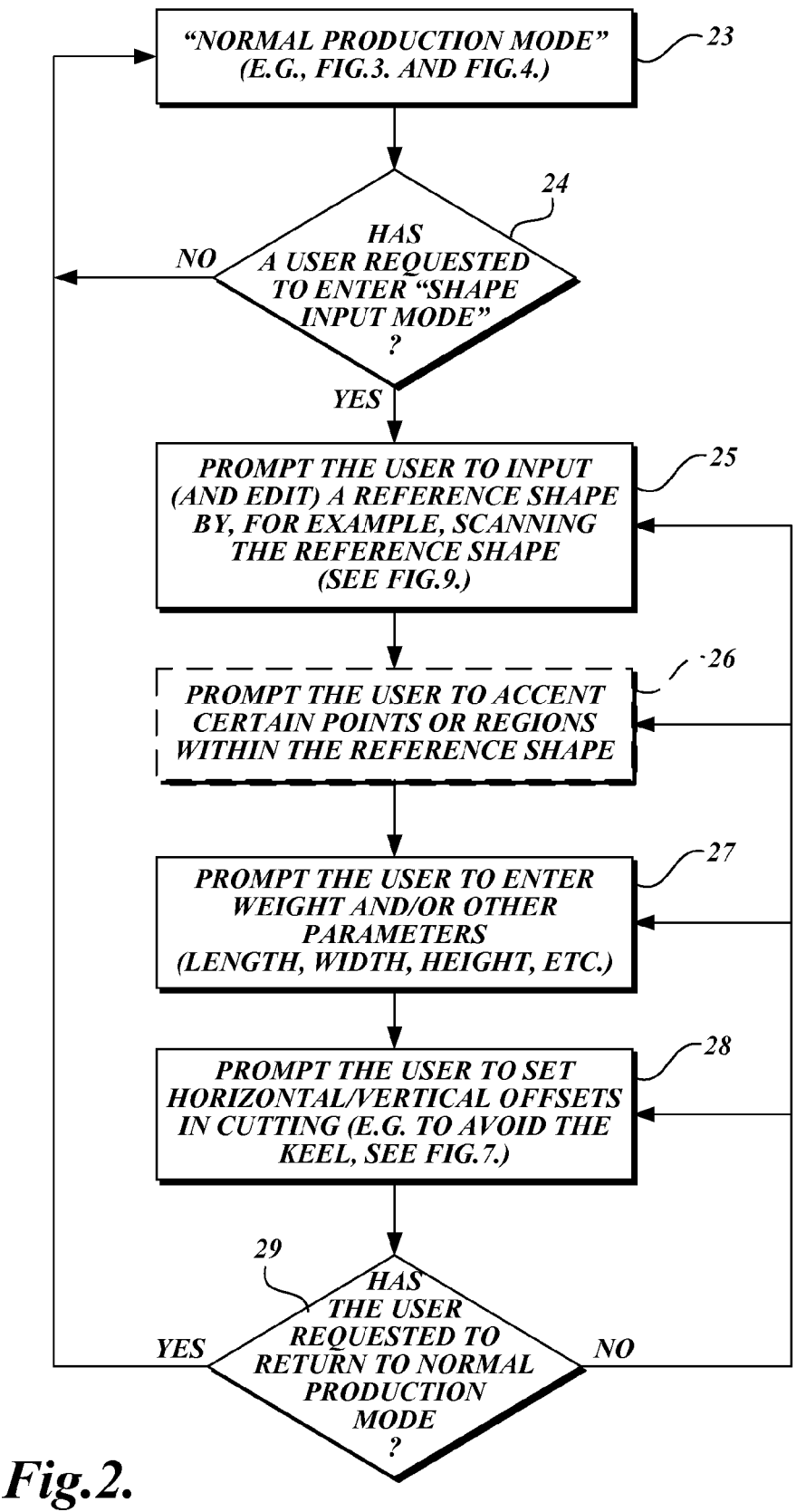
FIG. 2 is a flow chart illustrating the overall process for portioning workpieces into pieces having a specific shape while also meeting any other user-defined specifications, in accordance with one embodiment of the present invention.
Figure 7:
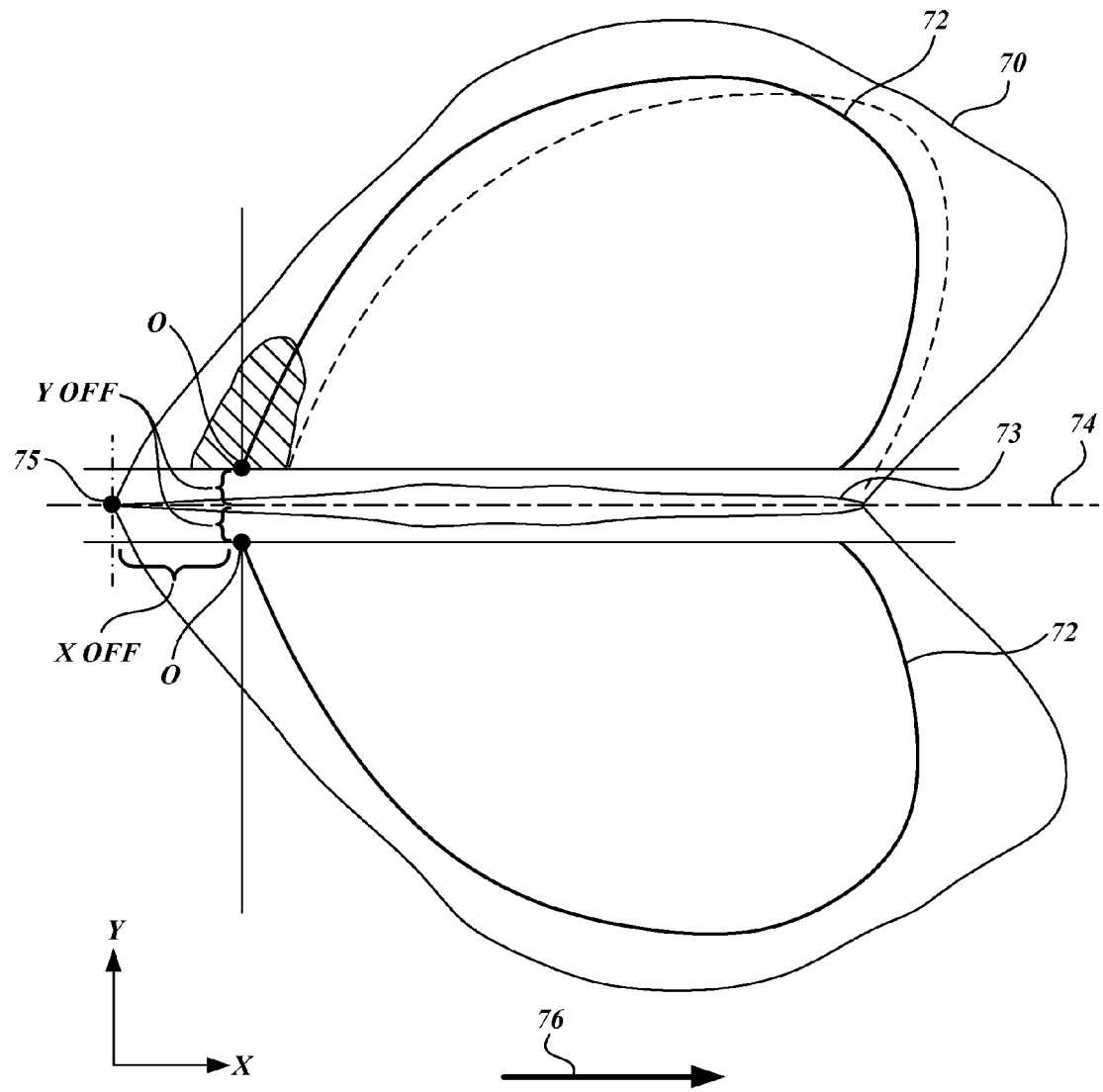
FIG. 7 illustrates a butterfly-shaped chicken breast workpiece, from which two half heart-shaped pieces are to be portioned.
Figure 8A:
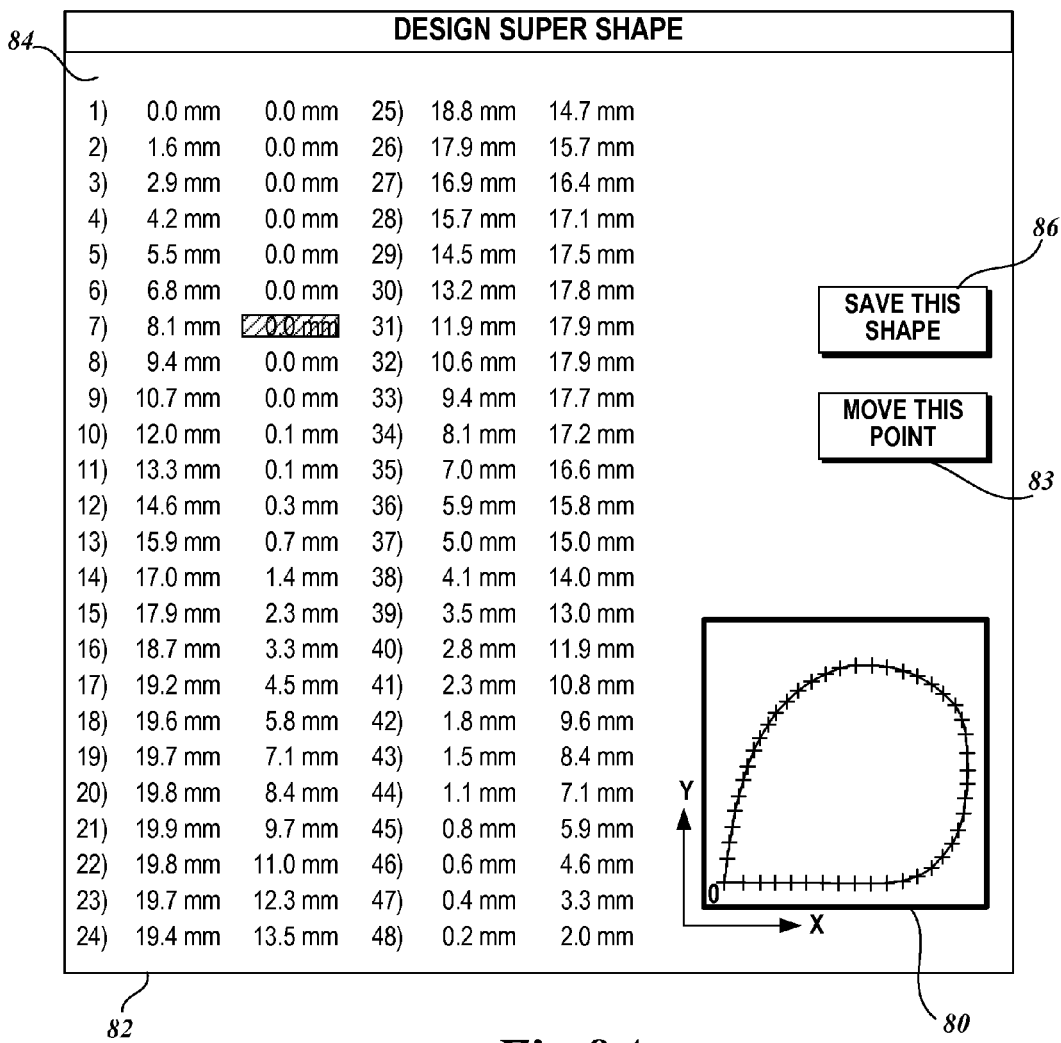
FIG. 8A is a sample screen shot, displayed on a monitor of the portioning system according to one embodiment of the present invention, defining a shape cutting path in a connect-the-dots model.

FIG. 2 is a flow chart illustrating the overall process for portioning workpieces into a specific shape and one or more user-defined parameters, according to one embodiment of the present invention. In step 23, the portioning system 10 is operating in Normal Production Mode. Some examples of routines to be performed in Normal Production Mode will be described in reference to FIGS. 3 and 4 below. In step 24, it is determined whether a user has requested to enter Shape Input Mode. For example, referring additionally to FIG. 1A, the user may request to enter Shape Input Mode by using any suitable input device 20a, for example, by clicking on a "Shape Input Mode" icon displayed on the monitor 20b. If such a request is received, then proceeding to step 25, the system 10 prompts the user to input (and perhaps also to edit) a reference shape, into which workpieces are to be portioned. For example, referring to FIG. 7, suppose that butterfly-shaped chicken breast workpiece 70 is to be portioned to produce one or two half heart-shaped pieces 72. The user may input the reference shape (the half-heart shape in this example) in various ways. For example, the system 10 may prestore several standard shapes, from which the user can select one as an initial template. Referring to FIG. 8A, suppose that the shape shown in a window 80 was prestored in the system 10 and selected by the user. At this point, a shape input/edit screen 82 shows the outline of the selected shape in the window 80 in a connect-the-dots model. The main screen 84 lists the X and Y coordinates of forty-eight (48) points that define the outline of the selected shape. Specifically, listed numbers 1-48 each has a pair of numbers, which show the X and Y coordinates of each point that forms the outline of the template shape shown in the window 80. The first point, which is point O at the lower left corner of the shape shown in the window 80, has the X and Y coordinates of (0,0).

At this point, the user may edit the connect-the-dots model in various ways. For example, the user may select the "move this point" icon 83 on the screen, and select a point, which will then be highlighted (see, for example, point 7 highlighted in the example of FIG. 8A). At this point, the user may use any of the arrow keys provided in any standard keyboard device 20a to move the selected point in X-Y space. For example, pressing the right arrow once will move the point to the +X direction by a certain increment, while pressing the up arrow once will move the point in the +Y direction by a certain increment.

Figure 8B:
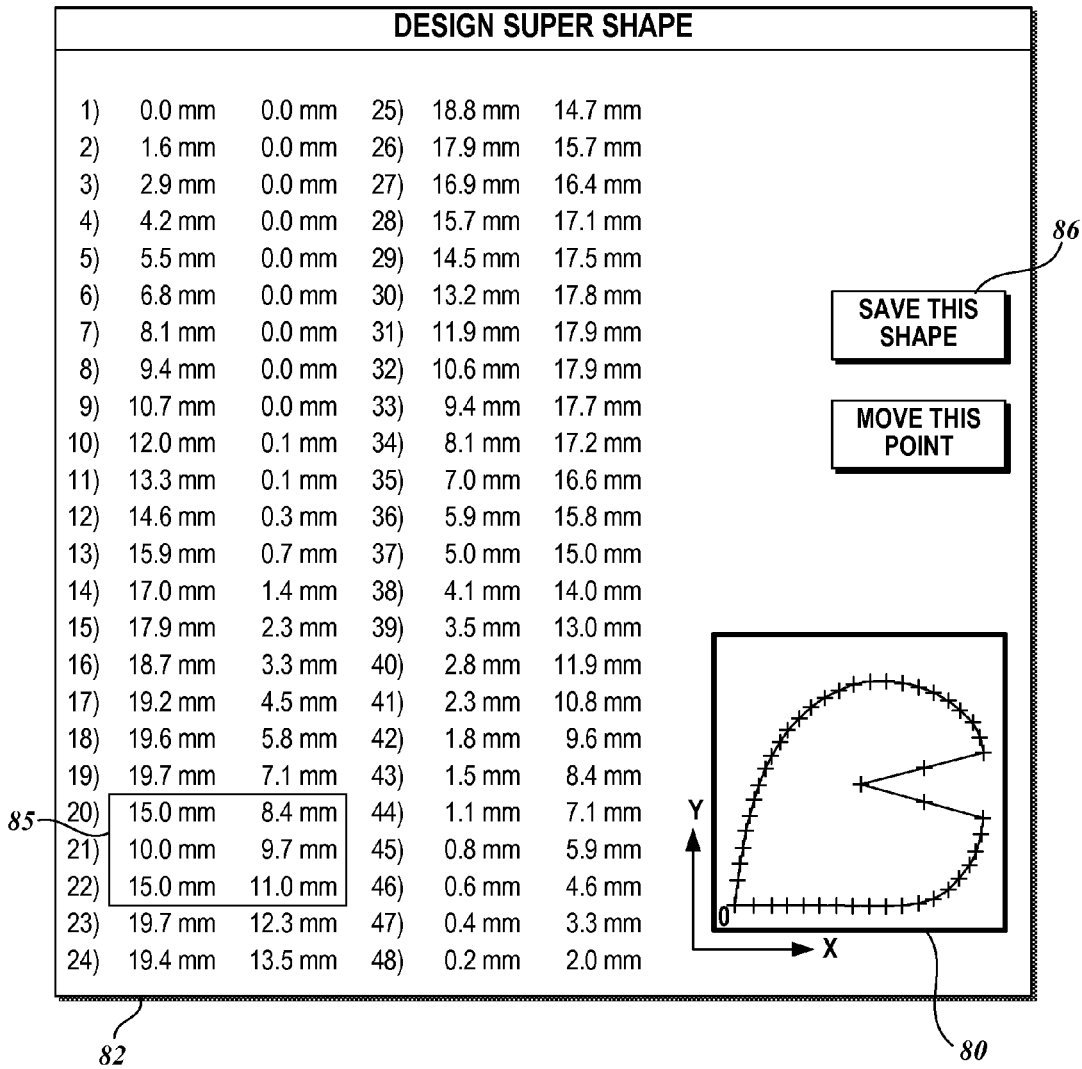
FIG. 8B is a sample screen shot of a shape cutting path, which has been modified from that shown in FIG. 8A, by including a notch into the shape of FIG. 8A.

Alternatively, referring to FIG. 8B, the user may select the X or Y value of the point the user wishes to edit, and then type in the new value directly into the list. For example, in FIG. 8B, the user may select the X and Y values of points 20, 21, and 22 by, for example, highlighting a section 85 on the screen, and then directly enter the new X and Y values to the list. As the user enters the new values, the shape outlined in the window 80 changes to correspond with the new X and Y values of these points. Once all the editing is completed and the user is satisfied with the final shape, the user may select a "save this shape" icon 86 on the screen to save the reference shape into the system memory.

While the above description describes a method of inputting a shape by editing an existing shape selected from a collection of prestored templates, it is also possible to create a new shape "from scratch," for example, by defining the X and Y coordinate values of all the points (e.g., points 1-48 in FIGS. 8A and 8B). This process may be preceded by the user plotting out a desirable shape on graph paper to ascertain X and Y values of the key points of the shape.

Further alternatively, according to one aspect of the present invention, a reference shape may be simply scanned into the system using the system's scanner 16. The method of scanning a reference shape for the purpose of creating a template will be more fully described below in reference to FIG. 9.

In one embodiment, the user-defined shapes may be stored (for example, up to 10 shapes) in the system memory so that the user can later recall any of the previously defined shapes.

Referring back to FIG. 2, after the reference shape has been entered, edited, and saved by the user, in step 26, the user may be further prompted to accent certain points or regions within the reference shape. The user-specified accent points will be used to slightly modify the reference shape (e.g., by moving in or out the accent points) when the shape requirement is not stringent, as will be more fully described below. Then, in step 27, the user is prompted to enter weight and/or other parameters of the final piece to be portioned from the workpiece. For example, the user may specify the maximum and minimum weight values for the final piece, and/or the maximum and minimum values for the length, width, and/or height (or thickness) of the final piece to be portioned from the workpiece. If the user wishes to portion workpieces into an exact weight, the user may set both the maximum and minimum weight values the same. Likewise, if any of the length, width, and height of the final product has to be at an exact value, the maximum and minimum values for that dimension may be set the same.

In step 28, the user is further prompted to set horizontal and vertical offsets to be used in cutting a workpiece. The concept of offset is described in detail in FIG. 7. In this case, from the butterfly-shaped chicken breast piece 70, two half heart-shaped pieces 72 are to be portioned. The chicken breast 70 has the keel 73 running along its center, which most users typically wish to exclude from the final products. Therefore, the user may set a Y-offset value ("Yoff"), which is a distance in the Y direction from a keel line 74 to the cutting starting point O of the half heart-shape 72, so as to avoid the keel 73. The keel line 74 for each product can be readily ascertained by the processor 20 evaluating the image obtained by scanning the workpiece 70. The user may also define an offset in the X direction ("Xoff"), which represents the distance from the trailing edge of the workpiece 70 to the cutting starting point O of the half heart-shape 72, assuming that the workpiece 70 is on a conveyor moving in the direction of an arrow 76. The user may define any desirable X and Y offsets, so as to avoid any undesirable areas in each cutting application.

Referring again back to FIG. 2, in step 29, it is determined if the user has requested to return to Normal Production Mode. If so, the process returns to step 23 and the system starts to operate in Normal Production Mode. Otherwise, the system remains in Shape Input Mode, and the user continues to input and/or edit the reference shape (step 25) and/or define various parameters and offsets (steps 26-28).

Figure 5A:
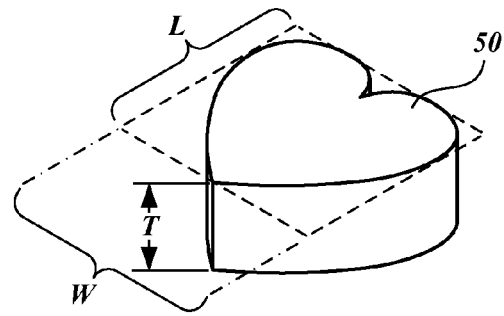
FIGS. 5A and 5B illustrate two cut pieces having the same shape and weight, but having different sizes (weight×length) due to the differences in thickness.
Figure 5B:
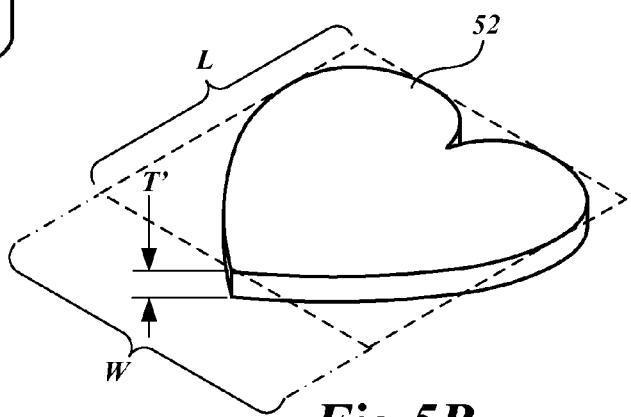

According to one aspect, the present invention is directed to an automatic portioning system to portion workpieces into a weight-specific uniform shape, such as into portions having both specific (e.g., uniform) weight (or weight range) and a specific (e.g., uniform) shape (or shape range), and therefore may be of varying sizes depending on the varying thickness of each workpiece. This concept is schematically illustrated in FIGS. 5A and 5B. In these figures, both pieces 50 and 52 have the same heart shape and also have the same weight; however, because the thickness (height) of the piece 50 is greater than that of the piece 52, the size (width×length) of the piece 50 is smaller than that of the piece 52. The thickness (height) of each workpiece, which may vary amongst multiple workpieces and also within a workpiece itself, is ascertained based on scanning, as described in the background section of the present invention above. In some cases, the thickness of workpieces may be predefined or known prior to their introduction into a system of the present invention. Further, the weight of the original workpiece, as well as the weight of each piece to be portioned from the workpiece, is calculated based on the volume, as ascertained from scanning, as multiplied by the density of the workpiece. The density may be predefined for each type of workpiece, and further may be updated based on the suitable feedback system. For example, referring to FIG. 1A, a weighing station 22 may be provided downstream from the cutter 18 to actually weigh the pieces (not shown in FIG. 1A) portioned from the original workpiece 14. The processor 20 compares the actual weight of the portioned piece with an assumed weight of the piece as previously calculated based on its volume and assumed density, and if the two values differ by more than a predefined amount, automatically updates the assumed density so as to more closely correspond with the actual weight measured at the weighing station 22.

Figure 3:
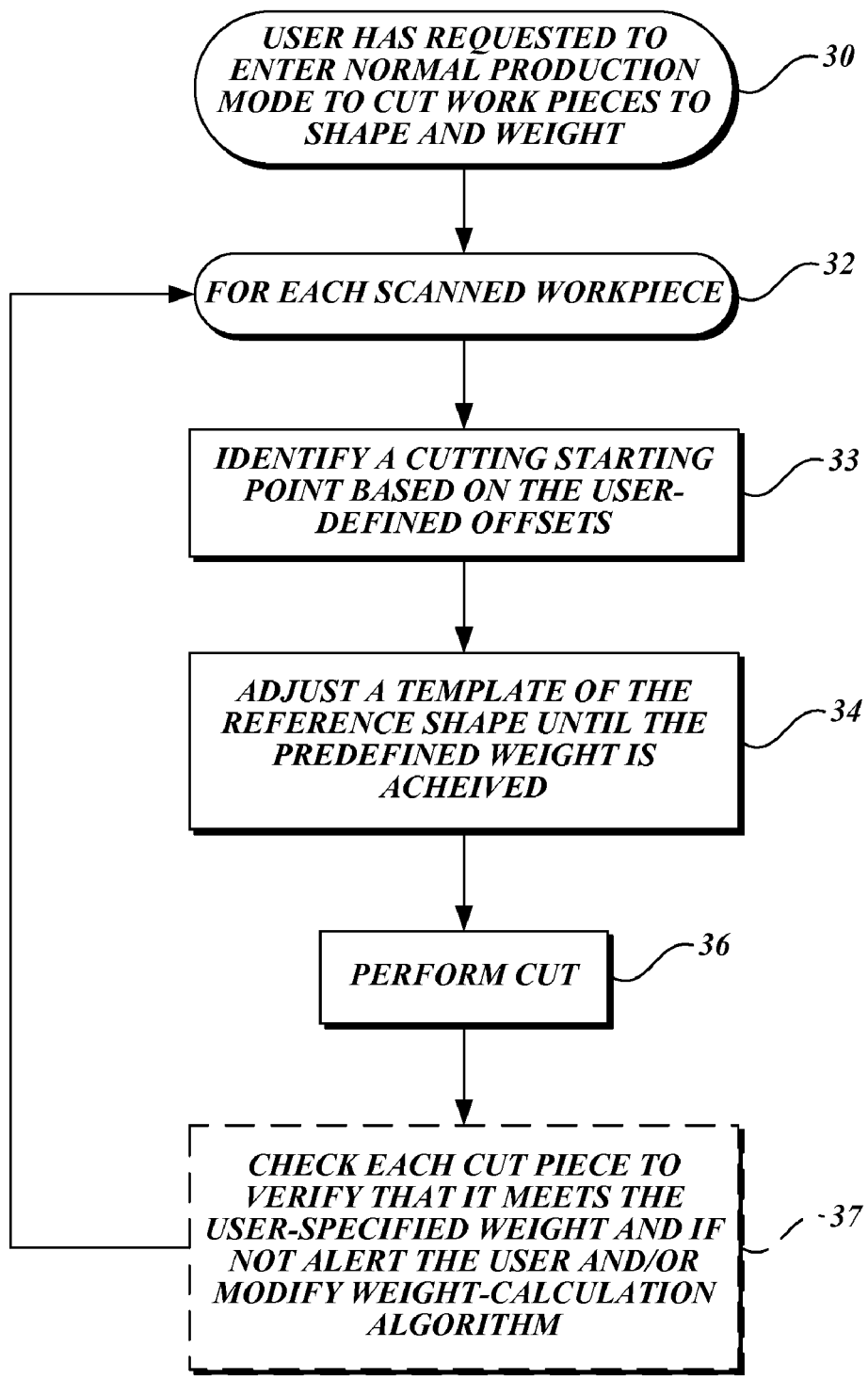
FIG. 3 is a flow chart illustrating the routine performed during Normal Production Mode of the system, in which workpieces are portioned to a specific shape and weight.

FIG. 3 is a flow chart illustrating a routine performed during Normal Production Mode, in which workpieces are to be portioned to a specific shape (or shape range) and weight (or weight range). In step 30, the user requests to enter Normal Production Mode to cut workpieces to shape and weight. Typically, the system 10 operates in Normal Production Mode by default, but entry into Normal Production Mode may be specified by the user, for example, after the user completes the operation in Shape Input Mode. Then, in Normal Production Mode, for each scanned workpiece (step 32), the processor 20 identifies a cutting starting point (see point O in FIG. 7) based on the user-defined offsets. As described above, the processor 20 can analyze the image of each incoming workpiece scanned in by the scanner 16 to identify the keel or any other landmark points, from which the cutting starting point is to be offset.

In step 34, the system automatically adjusts a template of the reference shape, previously specified by the user, until the predefined weight is achieved. For example, the template can be scaled up or down, depending on the varying thickness of each workpiece, in order to achieve uniform weight. This can be accomplished by, for example, proportionately varying the X and Y dimensions of the reference shape on the scanned-in workpiece (whose thickness and density information is known or ascertained) until the desired weight is calculated, while considering any user-defined offsets and also optionally avoiding undesirable product features such as keel, cartilage, defects, bone, and visible fat in the case of chicken and other meat. Alternatively, if the user has previously specified that the final product has to have a specific length, then the shape can be scaled up or down only in the width direction (in the Y direction in FIG. 7) without any change in the X direction, or if the user has previously specified that the final product has to have a certain width, then the template shape can be scaled up or down only in the length direction (in the X direction) without any change in the Y direction.

Further alternatively, the user may specify the amount and/or type of change allowed to the "ratio" between the length and width (e.g., Length/Width) so as to control the automatic adjustment process of a template shape. For example, the user may define that the "Length/Width" ratio may be increased from the ratio L/W of the original template shape, then the shape will be automatically stretched in the "L" direction disproportionately to any change made in the "W" direction so that the ratio L1/W1 of the resulting shape is greater than L/W. As another example, the user may define that the "Length/Width" ratio may be decreased from L/W of the original template shape, then the shape will be squashed in the "L" direction disproportionately to any change made in the "W" direction so that the ratio L2/W2 of the resulting shape is less than L/W. These types of automatic shape adjustments result in a shape that is somewhat disproportionately modified from the original template shape but that still meets a predefined weight requirement.

In some applications, the weight requirements may be relaxed and the workpieces may be cut into portions having approximate weight within a user-specified range. Likewise, the length and/or width requirements may also be relaxed depending on each application.

In step 36, the processor 20 controls the cutter 18 to cut the workpiece according to the cutting path determined in step 34 above. Then, optionally in step 37, each cut piece may be weighed, for example, at the weighing station 22 in FIG. 1A, to see if it meets the user-specified weight (or weight range), and if not, the system alerts the user and/or modifies the weight-calculation algorithm used by the system, for example, by updating the assumed density of the workpiece.

Figure 6A:
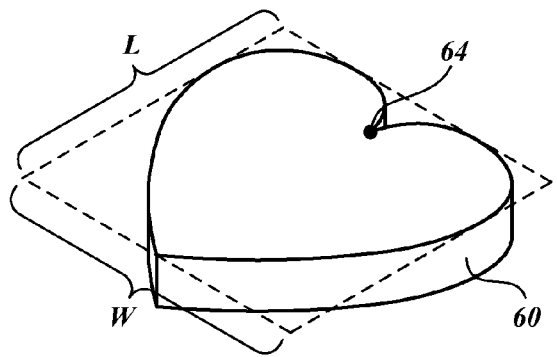
FIGS. 6A and 6B illustrate two cut pieces, wherein the shape of at least one of the pieces has been manipulated in a controlled manner so that the resulting pieces have the same weight and size, and also have generally similar shapes.
Figure 6B:
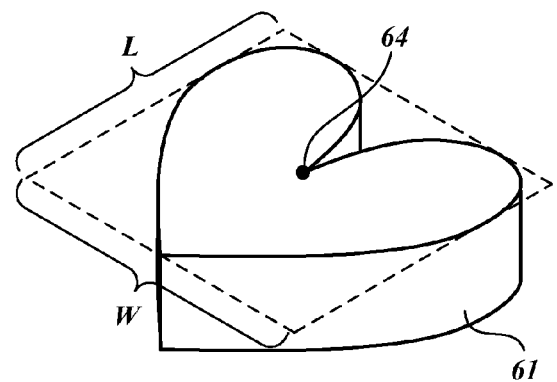

In some cases, a user desires a workpiece to be cut into only approximate shapes having both uniform weight and uniform size (width×length, measured along the plane of the conveyor) In these cases, the automatic portioning system of the present invention may permit a user to accent certain points or regions of the desired shape, and these user-specified points and regions are moved in and out (as opposed to the entire outline of the shape) until the desired weight is achieved, while also meeting the size requirement and keeping the shape generally the same as the original shape. FIGS. 6A and 6B schematically illustrate this concept, in which both portions 60 and 61 have the same weight (or weight range) and the same size (or size range) as defined by W×L (width× length). Suppose that the shape of the portion 60 is the original desirable shape, with an accent point 64 defined by the user. Suppose also that the portion 61 is thicker than the portion 60, as shown, and thus, to meet the same weight and size (width×length) requirements as the portion 60, it is necessary to somewhat modify the shape of the portion 61. As illustrated, this can be achieved by moving the accent point 64 in, so as to reduce the shape surface area of the portion 61 while maintaining the shape generally similar to the original shape. This adjustment method is suitable when the requirements for the weight and size are rather stringent, while the requirements for the shape are somewhat more relaxed.

Figure 4:
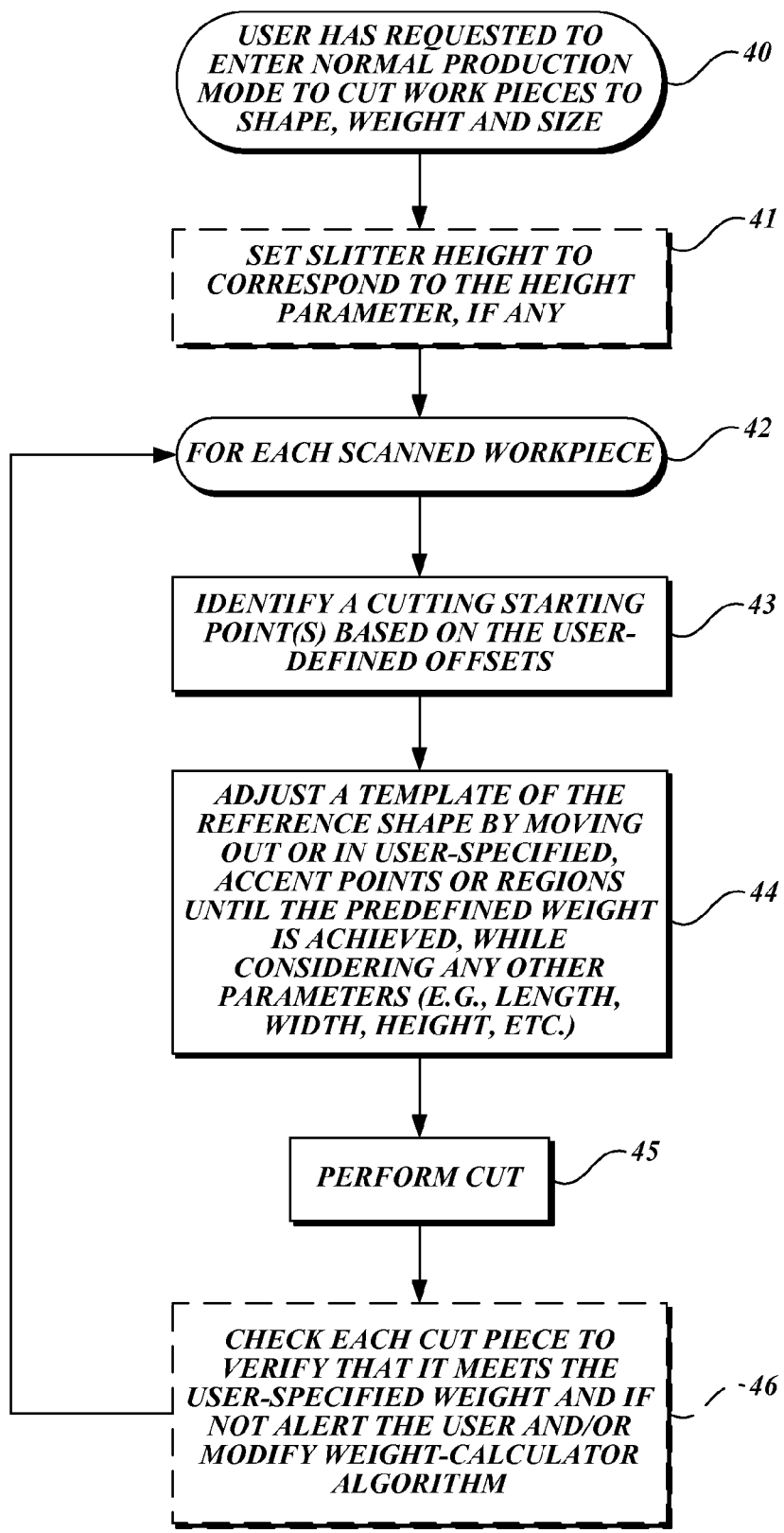
FIG. 4 is a flow chart illustrating the routine performed during Normal Production Mode of the system, wherein workpieces are portioned into a specific shape, weight, and size.

FIG. 4 is a flow chart illustrating the routine performed during Normal Production Mode to cut workpieces into size, weight, and "approximate" shape (the shape is allowed to vary somewhat), as described above in reference to FIGS. 6A and 6B (step 40). In step 41, the height of a slitter (not shown) is set to correspond to the height parameter defined by the user, if any. In step 43, for each scanned workpiece (step 42), a cutting starting point to portion out a piece from the workpiece is identified based on the user-defined offsets. In step 44, a template of the reference shape, previously entered by the user, is adjusted by moving in or out any user-specified accent point(s) or region(s) until the predefined weight (or weight range) is achieved, while also considering any size related parameters (e.g., length, width, etc.). As before, the adjustment process may be carried out while considering the user defined offsets and avoiding any undesirable product features such as keel, cartilage, defects, bone, visible fat, etc. In step 45, the system then operates the cutter 18 to execute the portioning based on the adjusted template. In step 46, as before, the actual cut piece may be weighed to verify if it meets the user-specified weight, for example, by using the weighing station 22 in FIG. 1A. If the cut piece does not meet the user-specified weight, the user may be notified of the fact, and further, the system may modify its weight-calculation algorithm, for example by correcting the assumed density of the type of workpieces. The use of accent points or regions permits the user to control and constrain any changes that may be allowed to the desired shape.

FIGS. 3 and 4 above describe exemplary uses of the system for portioning workpieces to shape and weight, or to shape, weight, and size, respectively. Various alternative uses of the present system are possible, as will be apparent to one skilled in the art. For example, in one embodiment, the system of the present invention may be used to cut workpieces into a specific shape and size, regardless of weight, while optionally avoiding undesirable material, such as keel, defects, and visible fat. Further alternatively or additionally, the system may be used to cut remaining trim from the portioning process into further desired products, such as strips and nuggets. In any of the various embodiments, workpieces are cut into portions having a specific or approximate shape, while also meeting one or more other specifications as defined by the user.

Figure 1B:
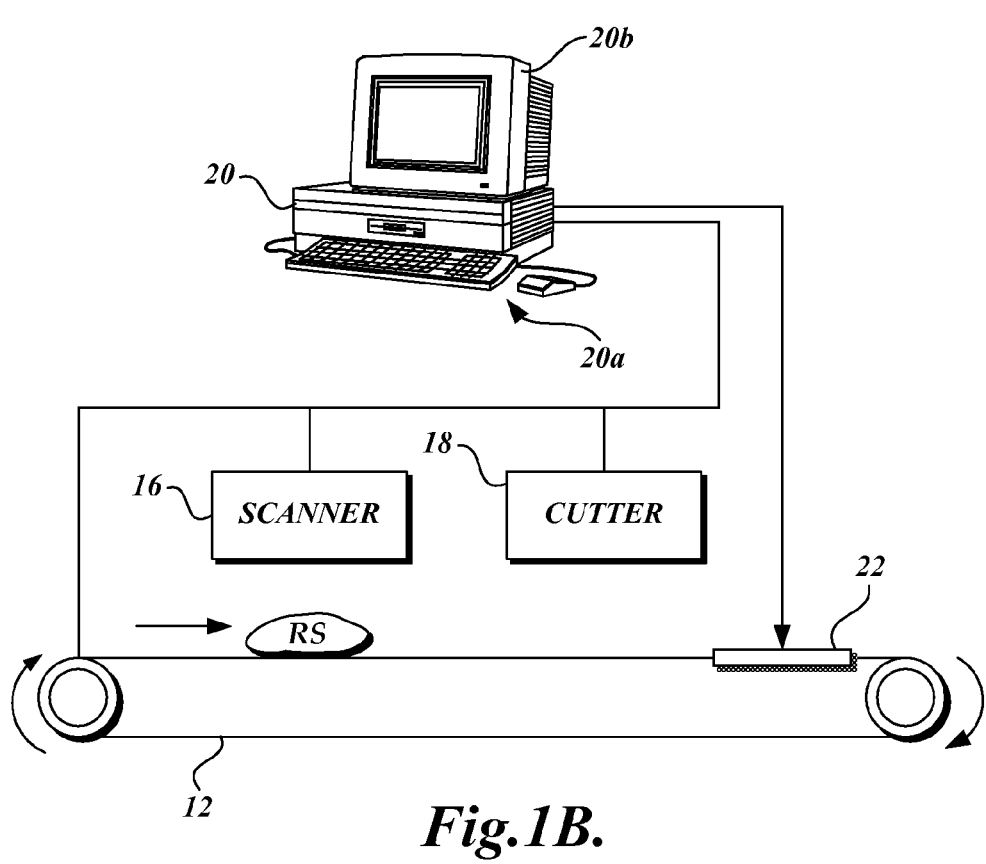
FIG. 1B illustrates the system of FIG. 1A, which is operated in Shape Scanner Mode to scan in a user-provided reference shape (RS)
Figure 9:
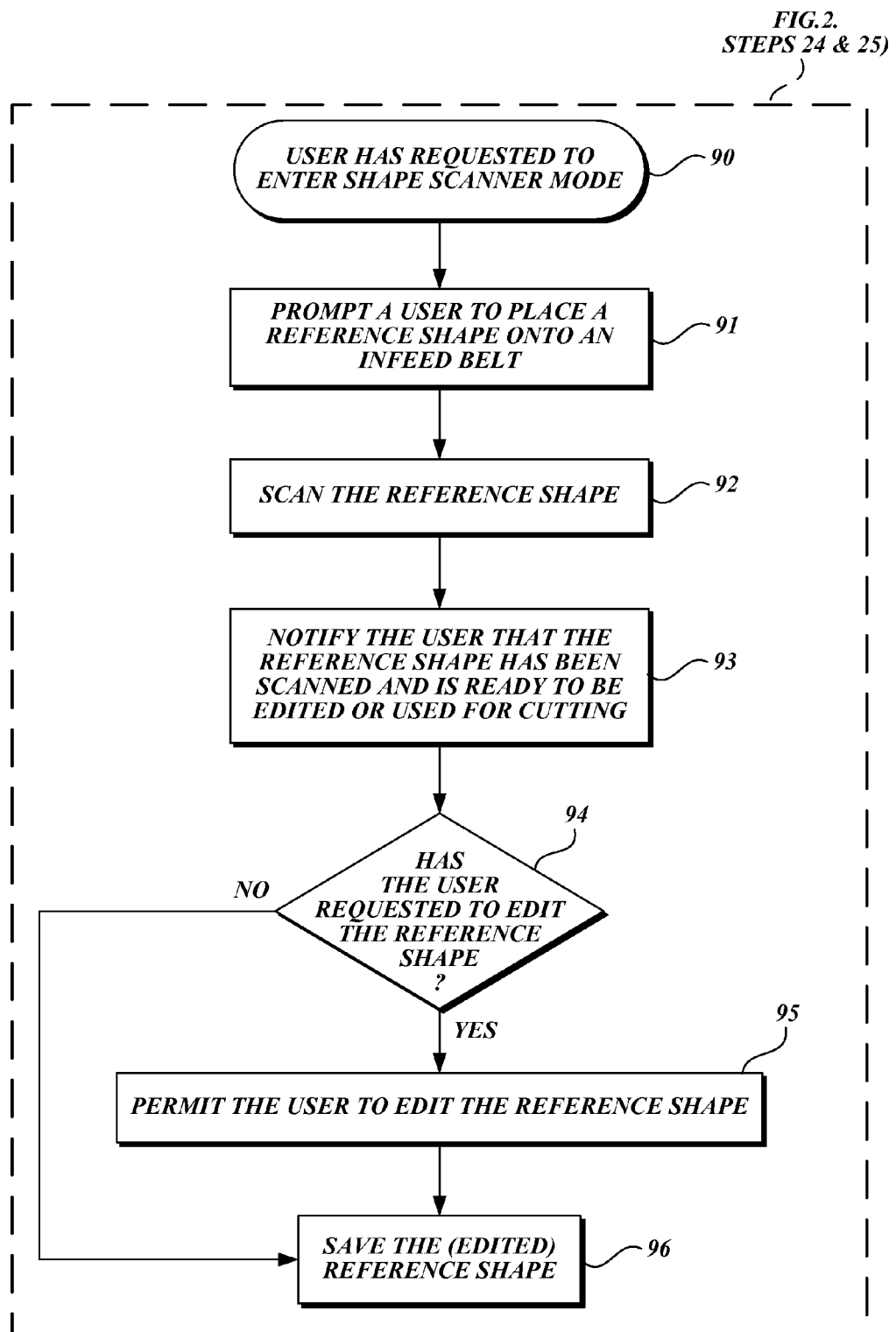
FIG. 9 is a flow chart illustrating the routine to be performed during Shape Scanner Mode, which is a special case of Shape Input Mode.

FIG. 9 is a flow chart illustrating the routine to be performed during Shape Scanner Mode, which is a special case of Shape Input Mode. Therefore, the flow chart of FIG. 9 generally replaces steps 24 and 25 of FIG. 2. In step 90, using any suitable user interface, the user requests to enter Shape Scanner Mode. (For example, by selecting the "Shape Scanner Mode" on-screen button on the monitor 20*b* of the system.) In step 91, the user is prompted to place a reference shape, made of any suitable material, onto an infeed belt of the system. The reference shape may be an actual product cut by scissors by the user, or may be a template shape cut out from cardboard, or made of clay, Play-Doh®, etc. Referring to FIG. 1B, once the user places the reference shape RS onto the conveyor, the scanner 16 scans in the reference shape (see step 92 of FIG. 9). Still referring to FIG. 9, in step 93, the system notifies the user that the reference shape has been scanned in and is ready to be edited or used for cutting. In step 94, it is determined whether the user has requested to edit the reference shape. If so, proceeding to step 95, the system permits the user to edit the reference shape, as previously described in reference to FIGS. 8A and 8B, above. Then, in step 96, upon user confirmation, the reference shape is saved into the system memory. Once the reference shape is saved, in various exemplary embodiments, the system instantly returns to Normal Operation Mode to use the saved reference shape in all subsequent cutting operations.

As will be apparent from FIG. 2, the user can interrupt the normal operation of the automatic portioning system 10 anytime to scan in and edit the desired shape template. The desired shape is stored into memory and will be used to control the downstream cutting/portioning equipment of the portioning system to cut the workpieces into the desired shape. In step 95 of FIG. 9, as before, the user may accent certain points or regions within the scanned-in shape for the purpose of controlling any changes allowed to the reference shape.

Accordingly, the present invention offers various methods and systems for automatically portioning workpieces into a certain or approximate shape, while also satisfying one or more other specifications defined by the user, such as weight and size. The final determination of the shape to be cut from each workpiece is further constrained by user-set values such as position offsets and avoidance areas (e.g., keel, bone, fat, etc.). Thus, in accordance with the present invention, a completely automatic shape cutting is possible, and further can be optimized, to provide for efficient cutting.

In accordance with a further aspect of the present invention, it is possible to consider the effect of meeting (or controlling) user-specified parameters on other parameters that are not directly controlled, prior to cutting. Specifically, the present invention further offers a method that may be used where a workpiece is being processed by cutting or trimming, and it is desired that the resulting cut or trimmed product have particular characteristics not directly controlled by the cutting or trimming process.

In many applications where a combination of two or more characteristics (or specifications) of the finished product are sought (e.g., shape, weight, length, width, etc.), it may be that one or more of these characteristics are directly controllable, and others are indirect results of the cutting or trimming process. For example, in trimming of chicken breasts, the shape and weight of the resulting trimmed piece may be directly controllable, as described above in reference to FIG. 3, but the thickness of the resulting piece may not be directly controlled, and thus may vary amongst multiple final products.

According to a further aspect of the present invention, where one or more characteristics cannot be directly controlled and yet are the results of controlling the directly controllable characteristics, the directly controllable characteristics are selected so as to optimize the indirectly-controlled characteristics. Specifically, in circumstances where more than one option exists for values of the directly controllable characteristics, and where a simulation can be done to assess the resulting indirectly-controlled characteristics prior to actually performing the cutting operations, then it is possible to achieve target values for all characteristics. The present invention provides a method of doing this, where the indirectly-controlled characteristics are measured and classified into one of several categories.

In the example of portioning chicken breasts, let the first step in the process be to capture a three-dimensional image of the chicken breast using the scanner 16 connected to the processor 20, as described above. The processor 20 will then have stored in its memory a 3D model of the chicken breast that can subsequently be used to simulate the effects of various cut patterns.

Assume that one set of acceptable target shape and weight is designated as SW1 and a second set as SW2, and one acceptable thickness range is designated as T1 and a second as T2. Assume also that the following three combinations of shape and weight requirements and thickness ranges are acceptable in the finished cut product.

SW1+T1

SW1+T2

SW2+T2

According to one example, the method proceeds as follows:

First, using the 3D model in processor memory, the effects of cutting to shape and weight requirements SW1 are simulated.

Second, using the new product boundary resulting from the simulated cuts according to SW1, and referring again to the 3D model, the thickness statistics (average thickness, for example) within the boundary are calculated.

Third, if the thickness as simulated is within the limits of range T1 or T2, then appropriate signals are generated to actually perform the simulated cut pattern and classify/sort the resulting cut product into a category corresponding to either SW1+T1 or SW1+T2, as appropriate.

Fourth, if the simulated thickness does not fall within either range T1 or T2, using the 3D model, the effects of cutting the workpiece according to the shape and weight requirements SW2 are simulated, and the thickness within the resulting boundary is evaluated and compared to the allowable limits (for SW2 only range T2 is acceptable). If the evaluated thickness is within the range, signals are issued to perform the simulated cut pattern according to SW2+T2.

Fifth, if neither cutting to requirements SW1 nor SW2 results in a product within the acceptable thickness range(s), then no solution exists.

Figure 10:
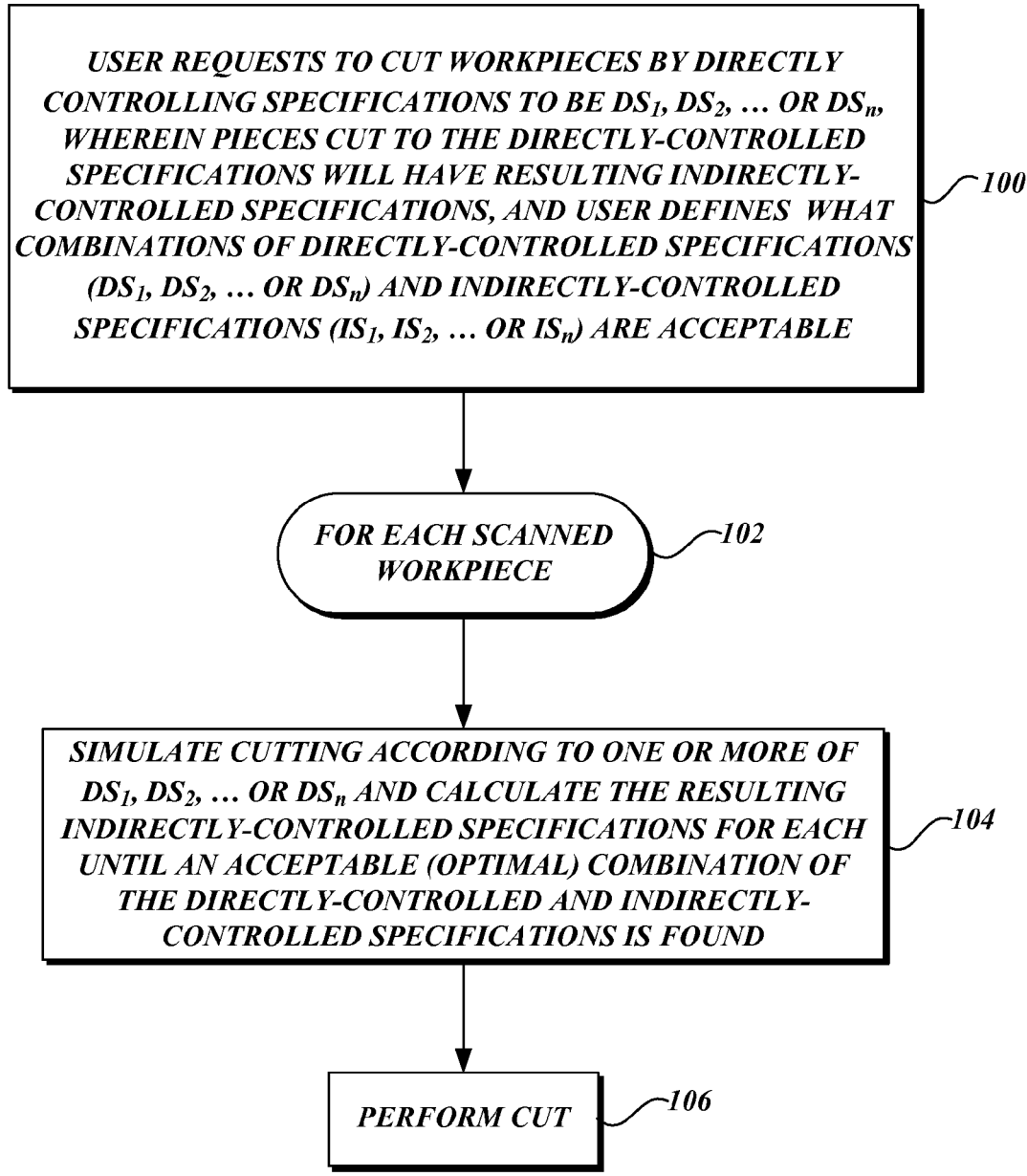
FIG. 10 is a flow chart illustrating a routine for evaluating the effects of cutting to certain specifications on the final product characteristics, which are not directly controlled by the portioning process, prior to performing an actual cut, according to a further aspect of the present invention.

FIG. 10 is a flow chart illustrating a general process of evaluating what effects cutting a workpiece according to certain specifications will have on the cut piece's other characteristics, which are not directly controlled by the cutting process, to ensure that the final piece will have desirable indirectly-controlled characteristics. In step 100, a user requests to cut workpieces by directly controlling certain specification(s) (e.g., shape, weight, etc.) so that they fall within one of multiple acceptable categories, such as by ensuring that one of multiple specification requirements $DS_1$, $DS_2$, ... or $DS_n$ is met. Further, the user requests that the pieces cut to the specification requirements $DS_1$, $DS_2$, ... or $DS_n$ need to have one or more resulting indirectly-controlled characteristic(s) (e.g., thickness), $IS_1$, $IS_2$, ... or $IS_n$.

Then, for each scanned workpiece (block 102), in block 104, cutting the workpiece according to one or more of the directly-controlled specifications ($DS_1$, $DS_2$, ... or $DS_n$) is simulated, and the resulting indirectly-controlled specification(s) for each simulated cutting is calculated. For example, cutting according to the specification $DS_1$ is simulated, and the indirectly-controlled specification (e.g., thickness) resulting from cutting to the specification $DS_1$ is calculated. If an acceptable combination of $DS_1$, $DS_2$, ... or $DS_n$ and $IS_1$, $IS_2$, ... or $IS_n$ is found, then the acceptable combination may be selected as the combination according to which the subsequent cut is to be performed. Various methods for selecting one combination are possible. For example, as with the previous example, it is possible to continue the simulation and calculation process until the first acceptable combination is found. Alternatively, a value function may be used to rank multiple alternative solutions. According to this variation, cutting to each of the multiple specification requirements ($DS_1$, $DS_2$, ... or $DS_n$, in this example) is simulated, and the resulting indirectly-controlled specification(s) (e.g., thickness) are calculated for each simulation and compared to the acceptable indirectly-controlled specification(s) ($IS_1$, $IS_2$, ... or $IS_n$). If multiple acceptable combinations exist, a suitable value function is used to select the most preferable combination.

After the acceptable, optimal combination of $DS_1$, $DS_2$, ... or $DS_n$ and $IS_1$, $IS_2$, ... or $IS_n$ is found, then proceeding to step 106, the portioning system is used to perform an actual cut according to the selected combination of the directly-controlled and indirectly-controlled specifications.

While the preferred embodiments of the invention have been illustrated and described, it will be appreciated that various changes can be made therein without departing from the spirit and scope of the invention.

The invention claimed is:

1. A method of automatically portioning a food workpiece into one or more final pieces, comprising:
   (a) receiving multiple acceptable specific combinations of two or more directly-controlled specifications of a final piece to be portioned from each workpiece, said directly-controlled specifications each being a desired, predetermined physical specification of a final piece, and one or more indirectly-controlled specifications of a final piece to be portioned from each workpiece, said indirectly-controlled specifications each being a desired, predetermined physical specification of a final piece that results from applying two or more directly-controlled specifications to a workpiece;
   (b) wherein said specific combinations of two or more directly controlled specifications of the final piece and the resulting one or more indirectly controlled specifications resulting from applying the directly controlled specifications to the workpiece, selected from the group consisting of:
      (i) the shape and mass of the final piece as directly controlled specifications and optionally the position of the final piece on the workpiece as an additional directly controlled specifications and optionally the aspect ration of the final piece as an additional directly controlled specification, and correspondingly one or more of the resulting length, width, and thickness of the final piece, as well as the avoidance of defects on the final piece, as indirectly controlled specifications, and
      (ii) the shape and size of the final piece as directly controlled specifications and optionally the aspect ratio of the final piece as an additional directly controlled specification and optionally the position of the final piece on the workpiece as an additional directly controlled specifications, and correspondingly one or more of the resulting mass and thickness of the final piece, as well as the avoidance of defects in the final piece, as indirectly controlled specifications, wherein size as a directly controlled specification is selected from the group consisting of one or more of length, width, and area of the final piece:
   (c) scanning a workpiece to obtain scanning information pertaining to the physical attributes of the workpiece;
   (d) simulating portioning the scanned workpiece according to specific combinations of two or more directly-controlled specifications and calculating the one or more indirectly-controlled specifications of the final piece to be portioned resulting from applying each of the specific combinations of the two or more directly-controlled specifications to the scanned workpiece;
   (e) using a algorithm to analyze the various specific combination of the two or more directly-controlled specifications and the resulting one or more indirectly-controlled specifications from step (d), and based on the results of such analysis selecting an acceptable specific combination of two or more directly-controlled specification and the resulting one or more indirectly-controlled specifications; and
   (f) portioning the workpiece according to the selected acceptable predetermined combination of two or more directly-controlled specifications and the resulting one or more indirectly-controlled specification as determined in step (e).

2. The method of claim 1, wherein step (e) comprises employing a value function to select an optimal combination composed of two or more directly-controlled specifications and one or more indirectly-controlled specification resulting from applying the specific combinations of two or more directly-controlled specifications to the food workpiece, from the multiple acceptable combinations of the specific combinations of two or more directly-controlled specification and the resulting one or more indirectly-controlled specifications; said value function ranking the desirability of the multiple acceptable predetermined specific combinations of two or more directly-controlled specifications and the resulting one or more indirectly-controlled specifications.

3. The method of claim 1, wherein:
step (d) comprises simulating portioning the workpiece according to two or more directly-controlled specifications of a first acceptable specific combination and calculating the one or more indirectly-controlled specifications of the final piece to be portioned resulting by applying the two or more directly-controlled specifications of the first acceptable specific combination to the workpiece; and
step (e) further comprises:
  (i) determining the specific combination of two or more directly-controlled specifications and the resulting one or more indirectly-controlled specifications calculated in step (d) to be an acceptable combination if they satisfy the first acceptable combination; and
  (ii) if they do not satisfy the first acceptable combination, determining the specific combination of two or more directly-controlled specifications and the resulting one or more indirectly-controlled specifications calculated in step (d) to be an acceptable combination if they satisfy a second acceptable combination.

4. The method of claim 1, wherein:
step (d) comprises simulating portioning the workpiece according to two or more directly-controlled specifications of a first acceptable combination and calculating the one or more indirectly-controlled specifications of the final piece to be portioned resulting by applying the specific combination of two or more directly-controlled specifications of the first acceptable combination to the workpiece; and
step (e) further comprises:
  (i) determining the specific combination of two or more directly-controlled specifications and the resulting one or more indirectly-controlled specifications calculated in step (d) to be an acceptable combination if they satisfy the first acceptable combination; and
  (ii) if they do not satisfy the first acceptable combination, returning to step (d) to simulate portioning the workpiece according to two or more directly-controlled specifications of a second acceptable specific combination and calculating the one or more indirectly-controlled specifications of the final piece to be portioned resulting from applying two or more directly-controlled specifications of the second acceptable specific combination to the workpiece, and determining the specific combination of two or more directly-controlled specifications and the resulting one or more indirectly-controlled specifications to be an acceptable combination if they satisfy the second acceptable combination.

5. The method of claim 1, wherein the specific combination of two or more directly-controlled specifications and the resulting one or more indirectly-controlled specifications are defined as predefined physical specification ranges.

6. A system for portioning a food workpiece into one or more final pieces, comprising:
a scanner for scanning the workpiece;
a cutter for portioning the workpiece; and
a processor coupled to the scanner and the cutter, the processor controlled by computer-executable instructions for performing the steps of:
  (a) receiving multiple acceptable specific combinations of two or more directly-controlled specifications and the resulting one or more indirectly-controlled specifications of a final piece to be portioned from each workpiece, said directly-controlled specifications each being a desired, predetermined physical specification of a final piece, and said indirectly-controlled specification, each being a desired, predetermined physical specification of a final piece that results from applying the two or more directly-controlled specifications to a workpiece;
  (b) wherein said specific combinations of two or more directly controlled specifications of the final piece and the resulting one or more indirectly controlled specifications resulting from applying the directly controlled specification to the workpiece, selected from the group consisting of;
    (i) the shape and mass of the final piece as directly controlled specifications and optionally the position of the final piece as directly controlled specifications and optionally the position of the final piece on the workpiece as an additional directly controlled specification and optionally the aspect ratio of the final piece as an additional directly controlled specification, and correspondingly one or more of the resulting length, width, and thickness of the final piece, as well as the avoidance of defects on the final piece, as indirectly controlled specifications, and
    (ii) the shape and size of the size of the final piece as directly controlled specifications and optionally the aspect ratio of the final piece as an additional directly controlled specification and optionally the position of the final piece on the workpiece as an additional directly controlled specifications, and correspondingly one or more of the resulting mass and thickness of the final piece, as well as the avoidance of defects in the final piece, as indirectly controlled specifications, wherein size as a directly controlled specification is selected from the group consisting of one or more of length, width, and are of the final piece;
  (c) controlling the scanner to scan a workpiece to obtain scanning information pertaining to the physical attributes for the workpiece;
  (d) simulating portioning the scanned-in workpiece according to specific combinations of two or more directly-controlled specifications and calculating the one or more indirectly-controlled specifications of the final piece to be portioned resulting from applying each of the specific combinations of the two or more directly-controlled specifications to the scanned workpiece;
  (e) using an algorithm to analyze the various specific combinations of the two or more directly-controlled specifications and the resulting one or more indirectly-controlled specifications from step (d) and based on the results of such analysis, selecting an acceptable specific combination of two or more directly-controlled specifications and the resulting one or more indirectly-controlled specifications based on said analysis; and
(f) controlling the cutter to portion the workpiece according to the selected acceptable predetermined combination of two or more directly-controlled specifications and the resulting one or more indirectly-controlled specifications as determined in step (e) above.

7. The system of claim 6, further comprising a conveyor for carrying the workpiece to be portioned as well as during portioning.

8. The system of claim 6, wherein the weight of a piece to be portioned from the workpiece is calculated based on a volume of the piece as determined from the scanning information and a known density of the workpiece.

9. The system of claim 6, wherein step (a) comprises controlling the scanner to scan one or more shapes included in the one or more directly-controlled specifications.

10. The system of claim 9, further comprising a user interface system that permits a user to edit the scanned-in one or more shapes.

11. The system of claim 6, further comprising an input device and an output device, and wherein the processor is further controlled by computer-executable instructions for performing:
(h) prompting a user to define, using the input device, one or more shapes that form the one or more directly-controlled specifications, the definition of a shape comprising X and Y coordinate values of points that define an outline of the shape in X-Y space as presented in an output device; and
(i) recording the user-defined shape in memory.

12. The system of claim 11, wherein the processor is further controlled by computer-executable instructions for permitting a user to edit the user-defined shape.

13. The system of claim 12, wherein the step of permitting a user to edit the user-defined shape comprises at least one of: (i) prompting a user to modify, using the input device, X and Y coordinates of points that define an outline of the user-defined shape in X-Y space as presented in the output device, and (ii) prompting a user to move, using the input device, a point on an outline of the user-defined shape as presented in the output device.

14. A non-transitory computer-readable medium including computer-executable instructions which, when loaded onto a computer, perform a method comprising:
(a) simulating portioning a food workpiece according to specific combinations of two or more directly-controlled specifications and calculating the one or more resulting indirectly-controlled specifications of the final piece to be portioned from the workpiece according to the two or more directly-controlled specifications, said directly controlled specifications each being a desired, predetermined physical specification of a final piece, and said indirectly-controlled specification, each being a desired, predetermined physical specification of a final piece that results from applying the two or more directly-controlled specifications to a workpiece;
(b) wherein said specific combinations of two or more directly controlled specifications of the final piece and the resulting one or more indirectly controlled specifications resulting from applying the directly controlled specifications to the workpiece, selected from the group consisting of:
(i) the shape and mass of the final piece as directly controlled specifications and optionally the position of the final piece on the workpiece as an additional directly controlled specification and optionally the aspect ratio of the final piece as an additional directly controlled specification, and correspondingly one or more of the resulting length, width, and thickness of the final piece, as well as the avoidance of defects on the final piece, as indirectly controlled specifications, and
(ii) the shape and size of the final piece as directly controlled specifications and optionally the aspect ratio of the final piece as an additional directly controlled specification and optionally the position of the final piece on the workpiece as an additional directly controlled specifications, and correspondingly one or more or the resulting mass and thickness of the final piece, as well as the avoidance of defects in the final piece, as indirectly controlled specifications, wherein size as a directly controlled specification is selected from the group consisting of one or more of length, width, and area of the final piece;
(c) using an algorithm to analyze the various specific combinations of the two or more directly-controlled specifications and the resulting one or more indirectly-controlled specifications from step (b) and based on the results of such analysis, selecting an acceptable specific combination of two or more directly-controlled specifications and the resulting one or more indirectly-controlled specifications based on said analysis.

15. The non-transitory computer-readable medium of claim 14, wherein step (d) comprises employing a value function to select an optimal specific combination of two or more directly-controlled specifications and the resulting one or more indirectly-controlled specifications from the multiple acceptable specific combinations, said value function ranking the multiple acceptable specific combinations of two or more directly-controlled specifications and the calculated one or more indirectly-controlled specification resulting from the two or more directly-controlled specifications.

16. The non-transitory computer-readable medium of claim 14, wherein:
step (a) comprises simulating portioning the workpiece according to two or more directly-controlled specifications of a first acceptable specific combination and calculating the resulting one or more indirectly-controlled specifications of the final piece to be portioned according to the two or more directly-controlled specifications of the first acceptable specific combination; and
step (d) further comprises:
(i) determining the two or more directly-controlled specifications and the resulting one or more indirectly-controlled specifications calculated in step (a) above to be an acceptable combination if they satisfy the first acceptable specific combination; and
(ii) if they do nor satisfy the first acceptable combination, determining the two or more directly-controlled specifications and the resulting one or more indirectly-controlled specifications analyzed in step (c) to be an acceptable combination if they satisfy a second acceptable specific combination.

17. The non-transitory computer readable medium of claim 14, wherein:
step (a) comprises simulating portioning the workpiece according to two or more directly-controlled specifications of a first acceptable specific combination and calculating the resulting one or more indirectly-controlled specifications of the final piece to be portioned according to the two or more directly-controlled specifications of the fist acceptable specific combination; and, step (d) further comprises:
(i) determining the two or more directly-controlled specifications and the resulting one or more indirectly-controlled specifications analyzed in step (c) above to be an acceptable combination if they satisfy the first acceptable specific combination; and
(ii) if they do not satisfy the first acceptable specific combination, returning to step (a) to simulate portioning the workpiece according to two or more directly-controlled specifications of a second acceptable specific combination and calculating the resulting one or more indirectly-controlled specifications of the final piece to be portioned according to the two or more directly-controlled specifications of the second acceptable specific combination, and determining the two or more directly-controlled specifications and the resulting one or more indirectly-controlled specifications to be an acceptable combination if they satisfy the second acceptable specific combination.

18. The non-transitory computer-readable medium of claim 14, wherein the specific combination of two or more directly-controlled specifications and the resulting one or more indirectly-controlled specifications are defined as predefined physical parameter ranges.

19. The system of claim 6, wherein step (e) comprises employing a value function to select an optimal combination of two or more directly-controlled specifications from the multiple acceptable specific combinations, said value function ranking the multiple acceptable specific combinations of two or more directly-controlled specifications and the resulting calculated one or more indirectly-controlled specifications.

20. The system of claim 6, wherein:
step (d) comprises simulating portioning the workpiece according to two or more directly-controlled specifications of a first acceptable specific combination and calculating the resulting one or more indirectly-controlled specifications of the final piece to be portioned according to the two or more directly-controlled specifications of the first acceptable specific combination; and
step (e) further comprises:
(i) determining the two or more directly-controlled specifications and the resulting one or more indirectly-controlled specifications calculated in step (d) above to be an acceptable combination if they satisfy the first acceptable specific combination; and
(ii) if they do not satisfy the first acceptable specific combination, determining the two or more directly-controlled specifications and the resulting one or more indirectly-controlled specifications calculated in step (d) above to be an acceptable combination if they satisfy a second acceptable specific combination.

21. The system of claim 6, wherein:
step (d)comprises simulating portioning the workpiece according to two or more directly-controlled specifications of a first acceptable specific combination and calculating the resulting one or more indirectly-controlled specifications of the final piece to be portioned according to the two or more directly-controlled specifications of the first acceptable specific combination; and
step (e) further comprises:
(i) determining the two or more directly-controlled specifications and the resulting one or more indirectly-controlled specifications calculated in step (d) above to be an acceptable combination if they satisfy the first acceptable specific combination; and
(ii) if they do not satisfy the first acceptable specific combination, returning to step (d) to simulate portioning the workpiece according to two or more directly-controlled specifications of a second acceptable specific combination and calculating the resulting one or more indirectly-controlled specifications of the final piece to be portioned according to the two or more directly-controlled specifications of the second acceptable specific combination, and determining the resulting one or more directly-controlled specifications and the one or more indirectly-controlled specifications to be an acceptable combination if they satisfy the second acceptable specific combination.

22. The system of claim 6, wherein the two or more directly-controlled specifications and the resulting one or more indirectly-controlled specifications are defined as predefined physical parameter ranges.

23. The method of claim 1, wherein step (c) comprises controlling the scanner to scan one or more reference shapes included in the two or more desired directly-controlled specifications.

24. The method of claim 23, further comprising providing a user interface system that permits a user to edit the scanned-in one or more reference shapes.

25. The method of claim 1, further comprising providing an input device and an output device, and wherein the processor is further controlled by computer-executable instructions for performing:
(f) prompting a user to define, using the input device, one or more reference shapes that form the two or more desired directly-controlled specifications, the definition of a reference shape comprising X and Y coordinate values of points that define an outline of the reference shape in X-Y space as presented in an output device; and
(g) recording the user-defined reference shape in memory.

26. The method of claim 25, wherein the processor is further controlled by computer-executable instructions for permitting a user to edit the user-defined reference shape.

27. The method of claim 26, wherein the step of permitting a user to edit the user-defined reference shape comprises at least one of: (i) prompting a user to modify, using the input device, X and Y coordinates of points that define an outline of the user-defined reference shape in X-Y space as presented in the output device, and (ii) prompting a user to move, using the input device, a point on an outline of the user-defined reference shape as presented in the output device to change the shape of the reference-shape.

* * * * *

UNITED STATES PATENT AND TRADEMARK OFFICE
CERTIFICATE OF CORRECTION

| | |
|---|---|
| PATENT NO. | : 8,412,366 B2 |
| APPLICATION NO. | : 12/369687 |
| DATED | : April 2, 2013 |
| INVENTOR(S) | : G. Blaine et al. |

Page 1 of 1

It is certified that error appears in the above-identified patent and that said Letters Patent is hereby corrected as shown below:

In the Claims

| COLUMN | LINE | ERROR |
|---|---|---|
| 12 (Claim 1, | 27 line 23) | "specifications" should read --specification-- |
| 12 (Claim 1, | 55-56 lines 51-52) | "combination" should read --combinations-- |
| 12 (Claim 1, | 60-61 lines 56-57) | "specification" should read --specifications-- |
| 12 (Claim 1, | 66 line 62) | "specification" should read --specifications-- |
| 13 (Claim 2, | 4 line 4) | "specification" should read --specifications-- |
| 14 (Claim 6, | 25-29 lines 25-29) | "(i) the shape and mass of the final piece as directly controlled specifications and optionally the position of the final piece as directly controlled specifications and optionally the position of the final piece" should read --(i) the shape and mass of the final piece as directly controlled specifications and optionally the position of the final piece-- |
| 14 (Claim 6, | 48 line 48) | "are" should read --area-- |
| 16 (Claim 17, | 67 line 9) | "fist" should read --first-- |

Signed and Sealed this
Twenty-eighth Day of April, 2015

Michelle K. Lee
*Director of the United States Patent and Trademark Office*